United States Patent Office 2,928,805
Patented Mar. 15, 1960

2,928,805

EPOXIDIZED RESINOUS POLYESTER CONTAINING TETRAHYDROPHTHALIC ANHYDRIDE AND COMPOSITIONS CONTAINING SAME

Robert H. Reiff, Lancaster, Pa., assignor to Armstrong Cork Company, Lancaster, Pa., a corporation of Pennsylvania No Drawing. Application April 8, 1957
Serial No. 651,157

9 Claims. (Cl. 260—45.4)

This invention relates to an epoxidized polyester and to polymerized vinyl chloride compositions containing the same.

The invention contemplates the epoxidized reaction product of a saturated glycol having 4–5 carbon atoms, a saturated dicarboxylic acid having 6–10 carbon atoms, and tetrahydrophthalic anhydride. The mole ratio of the saturated dicarboxylic acid and the tetrahydrophthalic anhydride is about 2:1. The acid number of the polyester before epoxidation is in the range of about 2–15 and the hydroxyl number is in the range of about 20–55. The invention also contemplates a composition of matter comprising the above-described epoxidized reaction product and polymerized vinyl chloride such as polyvinyl chloride and vinyl chloride-vinyl acetate copolymers. It has been found that the epoxidized reaction product serves as an unusually excellent combination plasticizer and stabilizer for the polymerized vinyl chloride compositions.

The polyester to be epoxidized to form the plasticizer-stabilizer of the present invention is one having narrow and critical properties. The polyester may be prepared from only three classes of ingredients. The first ingredient must be a 4–5 carbon atom saturated glycol, as for example 1,3-butylene glycol, 1,4-butylene glycol, diethylene glycol, and 1,5-pentalene glycol. The second ingredient must be a saturated dicarboxylic acid having a carbon chain of 6–10 carbon atoms, as for example adipic acid, sebacic acid, azelaic acid, methyl adipic acid, and the like. The third ingredient must be tetrahydrophthalic anhydride. The ratio of the saturated dicarboxylic acid to the tetrahydrophthalic anhydride must be about 2:1 on a mole basis. Generally speaking, the total hydroxyl equivalent in the glycol will equal the total carboxylic acid equivalents in the two acids during preparation, except for the fact that it is customary and sometimes essential to use an excess of the glycol in the making of the polyester. The acid number of the finished polyester prior to epoxidation must be in the range of about 2–15 and the hydroxyl number must be in the range of about 20–55.

The preparation of the polyester prior to epoxidation may be carried out along the lines of known polyester technics. The three ingredients may simply be mixed together and heated to increasingly elevated temperatures to produce the desired product. Preferably, however, the glycol may be caused to react with the tetrahydrophthalic anhydride at a temperature of about 90° C. The end of the formation of the half ester can readily be seen by the disappearance of the white solid tetrahydrophthalic anhydride from the solution, causing the solution to become homogeneous. Once the half ester is formed, the saturated dicarboxylic acid may be added and the temperature of the mixture may be increased to about 145° C.

During the addition of the two acids an inert gas flow should be maintained through the solution to minimize side reactions that might occur in the presence of air. After holding the temperature at 145° C. for a suitable period of time, for example about one hour, the temperature may be increased slowly to a temperature for example of about 200° C. The time required for this increase of temperature is dependent upon the boiling point of the glycol used. If the boiling point of the glycol is below about 210° C., the time required would be on the order of 2–3 hours, while boiling points above about 210° C. allow the reduction of time to about 1 to about 1½ hours.

The temperature should be held at about 200° C. until an acid number of about 30 is obtained. If the glycol boils above about 210° C., the temperature may then be increased from 200° C. to about 220° C. For those glycols boiling below about 210° C., the temperature should be maintained at about 200° C. In any case, these temperatures should be maintained at their respective levels until the final end point is reached. In the latter stages of polymerization, where the acid number is below about 30 and the hydroxyl number is to be lowered further, the rate of decrease of the hydroxyl number may be dependent upon the rate of flow of carbon dioxide or other inert gas and upon the temperature of the polymer. In order to obtain a rapid decrease of the hydroxyl number in the latter stages of polymerization, the temperature of the polyester should be above the boiling point of the glycol used and the gas flow increased to such a rate that the volatile glycol is swept from the reaction mixture. For the polyesters to be suitable for use in the present invention, it is necessary to obtain an acid number in the final product in the range of about 2–15 and a hydroxyl number in the range of about 20–55. A preferred embodiment calls for an acid number in the range of about 5 plus or minus 1 and a hydroxyl number of about 35 plus or minus 5. With these latter limits on acid numbers and hydroxyl numbers, the molecular weight will generally vary from about 3,400 to about 2,380.

Following the preparation of the polyester, it is necessary to epoxidize the double bonds in the polymer. These are the double bonds present originally in the tetrahydrophthalic anhydride. Known technics for epoxidation of such a bond may be used. The polyester may be taken up in a 50:50 mixture of glacial acetic acid and benzene in an amount by weight approximately twice that of the polyester. The mixture should be cooled, preferably to a temperature in the range of about 10°–20° C. A previously prepared mixture of peracetic acid and anhydrous sodium acetate may be slowly and carefully added to the polyester reaction mass. Sufficient time after complete addition of the peracetic acid solution should be allowed for the reaction to run to completion at a temperature of approximately 25° C.; usually one hour suffices. Following completion of the reaction, the reaction mixture may be worked up as by washing with saturated sodium chloride solution, neutralization with sodium bicarbonate solution, washing with water, and distillation, so as to recover the epoxidized polyester in substantially pure form.

The epoxidized polyester is to be incorporated into a polymerized vinyl chloride. The term "polymerized vinyl chloride" is meant to include both polyvinyl chloride and vinyl chloride-vinyl acetate copolymers; these latter copolymers generally contain up to about 13% by weight vinyl acetate copolymerized with the vinyl chloride.

The amount of epoxidized polyester to be used will vary with the precise composition desired. Generally, the amount of the epoxidized polyester will be in the range of about 10%–75% by weight based on the weight of the plasticizer-polymerized vinyl chloride mixture. The epoxidized polyester plasticizer is readily incorporated in the polymerized vinyl chloride composition by simple mixing as on a mill, Banbury, or other suitable mixer. The resulting plastisol may be reground into particulate form or it may be used as a sheet in the form of a thin film or other sheet having suitable dimensions. The customary fusion of the polymerized vinyl chloride must then be carried out in accordance with known procedures in order to develop the ultimate properties of the plasticized polymerized vinyl chloride compositions.

The plasticized polymerized vinyl chloride composition of the present invention exhibits excellent properties. There is no plasticizer sweat-out as is so often encountered with other plasticizers. Additionally, the present plasticizer imparts a degree of heat and light stability to the plasticized composition which is unique. No additional stabilizing agent need be added. Hence the plasticized composition of the present invention may be used with fillers and pigments to form the wearing surface on wall and floor coverings.

The following examples illustrate several embodiments of the invention. All parts are by weight unless otherwise stated.

EXAMPLE I

*Preparation of 1,4-butylene glycol tetrahydrophthalate adipate*

Into a container equipped with a stirrer, reflux condenser, an inlet for the admission of dry carbon dioxide, a thermal regulator, and a thermometer was placed 643 parts (7.14 moles, 19% excess) 1,4-butanediol. Carbon dioxide flow was started and the temperature of the 1,4-butanediol was taken to 80° C. To the heated 1,4-butanediol was added 304.3 parts (2 moles) tetrahydrophthalic anhydride. The anhydride was added slowly to the reaction mixture so there would not be a sharp decrease in temperature. Mixing was continued until a homogeneous solution was obtained, and then 584.8 parts (4 moles) adipic acid was added slowly to the hot stirred mixture. After all the adipic acid was added, the temperature was increased to 145° C. over a period of 30 minutes and held at that temperature for one hour. Water began to distill off.

The temperature was then raised to 200° C. over a period of 90 minutes and maintained at that temperature until an acid number of 30 plus or minus 2 was obtained. The time required to reach that acid number was approximately 400 minutes. When an acid number of 30 was obtained, the temperature of the mixture was raised to 230° C. over a period of 60 minutes and the flow of carbon dioxide was increased. The temperature was maintained at 230° C. for 200 minutes, after which the temperature was increased to 245° C. over a 60-minute period and the gas flow was further increased. The batch temperature was maintained at 245° C. until an acid number of 3–6 was obtained. The final hydroxyl number was 27. The polyester was then cooled.

EXAMPLE II

*Epoxidation of 1,4-butanediol tetrahydrophthalate adipate*

To a mixture of 315 parts glacial acetic acid and 263 parts benzene was added 317 parts of 1,4-butanediol tetrahydrophthalate adipate, and the solution was cooled with stirring to 15°–20° C. A previously prepared mixture of 11.4 parts of anhydrous sodium acetate and 209 parts of 40% peracetic acid was slowly added to the polyester solution maintained at 15°–20° C. The first one-third of the peracetic acid solution was added dropwise, while the remaining two-thirds was added slightly faster. After the peracetic acid solution had been completely added, temperature was maintained at 25° C. for one hour with stirring.

The reaction mixture was washed with saturated sodium chloride solution, neutralized with sodium bicarbonate solution, water washed, and allowed to separate. The remaining water and the benzene were removed by distillation at a temperature of 55° C. at the pressure of 125 mm. of mercury absolute. The yield was 312 parts of the epoxidized product having an iodine value of 6 and an oxirane oxygen content of 2%.

EXAMPLE III

*Preparation of the plasticized polymerized vinyl chloride composition*

A plastisol was prepared containing 5 parts of the epoxidized 1,4-butanediol tetrahydrophthalate adipate and 5 parts of polyvinyl chloride (Geon 121). The plastisol was spread on a glass plate, fused for 10 minutes at 350° F., allowed to cool, and the resulting film was removed from the plate. The film was flexible, homogeneous, strong, and of a light straw color.

A control prepared as described immediately above save that it contained 1,4-butanediol tetrahydrophthalate adipate as a plasticizer was considerably darker in color, indicating poor heat stability. Additionally, the film appeared less homogeneous and clear, indicating poor compatibility.

EXAMPLE IV

*Plasticized sheet product*

A sheet was prepared having the following ingredients:

| | Parts |
|---|---|
| Vinyl chloride-vinyl acetate copolymer (5% vinyl acetate) | 354.5 |
| Vinyl chloride-vinyl acetate copolymer (13% vinyl acetate) | 95.5 |
| Tricresyl phosphate | 131.2 |
| Epoxidized 1,4-butanediol tetrahydrophthalate adipate | 98.1 |
| Ceresin wax | 6.8 |
| Barium-cadmium laurate | 13.3 |
| Sodium phosphate on clay carrier | 13.5 |
| Asbestos filler | 232.0 |
| Ground limestone | 98.1 |
| Pigment | 95.3 |

The above ingredients were preblended in a Hobart mixer for 5 minutes. The mixture was then transferred to a Banbury which had been preheated to 200° F. Mixing was continued for approximately 3 minutes until the temperature reached 310° F. The mixture was then sheeted out on a Thropp mill with 270°–240° F. roll temperature, with cross sheeting six times. The sheets were then press polished in a hydraulic press, platen temperature 340° F. After cooling, the sheets were removed.

The sheets constituted an excellent floor covering material when adhered to a backing. Heat stability and plasticizer sweat-out showed considerable improvement over a control sheet prepared with identical ingredients and under identical conditions save that in place of the epoxidized 1,4-butanediol tetrahydrophthalate adipate there was used as a plasticizer epoxidized soya bean fatty acids.

EXAMPLE V

*Preparation of 1,5-pentanediol tetrahydrophthalate adipate*

A mixture of 292 parts (2 moles) of adipic acid, 153 parts (1 mole) of tetrahydrophthalic anhydride, and 372 parts (3.57 moles) of 1,5-pentanediol was heated in a flask equipped with a water trap to 145° C. with stirring in an inert atmosphere to 145° C. The procedure was then completed as in Example I to an acid number of 4–6 and a hydroxyl number of 35–40.

EXAMPLE VI

*Preparation of 1,4-butenediol tetrahydrophthalate sebacate*

A mixture of 404 parts (2 moles) of sebacic acid, 153 parts (1 mole) of tetrahydrophthalic anhydride, and 321 parts (3.57 moles) of 1,4-butanediol was treated as in Example I to form a polyester having an acid number of 5-8 and a hydroxyl number of 40-45.

EXAMPLE VII

Epoxidation of the polyesters prepared in Examples V and VI is carried out as in Example II. Films formed with polyvinyl chloride as in Example III are all strong, light-colored, and homogeneous.

I claim:

1. An epoxidized resinous polyester prepared by the process of reacting at elevated temperature in the range of 90°-245° C. ingredients consisting of a saturated glycol having 4-5 carbon atoms, a saturated, aliphatic dicarboxylic acid having 6-10 carbon atoms, and tetrahydrophthalic anhydride to form a polyester having an acid number of about 2-15 and a hydroxyl number of about 20-55, wherein said saturated acid and said tetrahydrophthalic anhydride are present in a mole ratio of about 2:1, and subsequently epoxidizing said polyester at a temperature in the range of 10°-25° C. with peracetic acid at the site of the double bond in said tetrahydrophthalic anhydride to introduce 2% by weight oxirane oxygen.

2. An epoxidized polyester according to claim 1 wherein said saturated glycol comprises 1,4-butanediol and said saturated dicarboxylic acid comprises adipic acid.

3. An epoxidized polyester according to claim 1 wherein said saturated glycol comprises 1,5-pentanediol.

4. An epoxidized polyester according to claim 1 wherein said saturated dicarboxylic acid comprises sebacic acid.

5. A polymerized vinyl chloride composition plasticized with the epoxidized polyester of claim 1.

6. A composition according to claim 5 wherein said polymerized vinyl chloride comprises polyvinyl chloride.

7. A composition according to claim 5 wherein said polymerized vinyl chloride comprises a vinyl chloride-vinyl acetate copolymer.

8. A composition according to claim 5 containing about 10%-75% by weight of said epoxidized polytster.

9. A composition according to claim 8 containing about 50% by weight of said epoxidized polyester.

References Cited in the file of this patent

UNITED STATES PATENTS

| 2,720,500 | Cody | Oct. 11, 1955 |
| 2,801,232 | Suen | July 30, 1957 |

FOREIGN PATENTS

| 529,416 | Canada | Aug. 21, 1956 |